US012764836B2

(12) United States Patent
Kim et al.

(10) Patent No.: US 12,764,836 B2
(45) Date of Patent: Oct. 13, 2026

(54) INDUCTION HEATING APPARATUS AND METHOD FOR CONTROLLING THE SAME

(71) Applicant: LG ELECTRONICS INC., Seoul (KR)

(72) Inventors: GwangRok Kim, Seoul (KR); Hyunjun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 811 days.

(21) Appl. No.: 18/112,673

(22) Filed: Feb. 22, 2023

(65) Prior Publication Data

US 2023/0269836 A1 Aug. 24, 2023

(30) Foreign Application Priority Data

Feb. 22, 2022 (KR) ........................ 10-2022-0023250

(51) Int. Cl.
*H05B 6/06* (2006.01)
*H05B 6/12* (2006.01)

(52) U.S. Cl.
CPC ......... *H05B 6/062* (2013.01); *H05B 2213/04* (2013.01); *H05B 2213/07* (2013.01)

(58) Field of Classification Search
CPC . H05B 2213/04; H05B 2213/07; H05B 6/062
USPC ....... 219/600, 620, 624, 626, 632, 660, 661, 219/662, 663, 664, 665; 363/78, 98, 124, 363/126
See application file for complete search history.

(56) References Cited

U.S. PATENT DOCUMENTS 9,462,638 B2 * 10/2016 Lee .......................... H05B 6/06
2014/0027443 A1 1/2014 Lee et al.
2024/0114601 A1 * 4/2024 Seong .................... H05B 6/062

FOREIGN PATENT DOCUMENTS

CN 103565290 A 2/2014
EP 2094059 B1 8/2014
KR 10-2019-0094521 A 8/2019
WO 2022145569 A1 7/2022

* cited by examiner

*Primary Examiner* — Quang T Van
(74) *Attorney, Agent, or Firm* — Bryan Cave Leighton Paisner LLP

(57) ABSTRACT

A method for controlling an induction heating apparatus includes starting to heat a container, obtaining an inductance value of the container, calculating an overheating determination index based on the inductance value, comparing the overheating determination index with a predetermined first reference value, and determining whether to stop heating the container based on results of the comparison between the overheating determination index and the first reference value.

20 Claims, 6 Drawing Sheets

INDUCTION HEATING APPARATUS AND METHOD FOR CONTROLLING THE SAME

CROSS-REFERENCE TO RELATED APPLICATION

This application claims priority to and the benefit of Korean Patent Application No. 10-2022-0023250, filed on Feb. 22, 2022, the disclosure of which is incorporated herein by reference in its entirety.

TECHNICAL FIELD

Disclosed herein are an induction heating apparatus and a method for controlling the same.

BACKGROUND

Induction heating apparatuses heat a container, based on an induction heating method. As electric energy is supplied to a working coil included in an induction heating apparatus, a magnetic field is formed around the working coil. The magnetic field generates eddy current in a container that is placed on the working coil, to heat the container.

FIG. 1 is an exploded perspective view showing a working coil assembly being disposed in an induction heating apparatus of one embodiment.

As illustrated in FIG. 1, the working coil assembly of one embodiment comprises a coil base 30, a first working coil 31, and a second working coil 32.

The coil base 30 is a structure for accommodating and supporting the first working coil 31 and the second working coil 32. The coil base 30 can have a shape (e.g, a circle, a square and the like) corresponding to those of the first working coil 31 and the second working coil 32, and made of a non-conductive material.

The first working coil 31 is mounted on the coil base 30, and wound by a first rotation number in a radial direction. The second working coil 32 is mounted on the coil base 30, and wound by a second rotation number in the radial direction while sharing the center with the first working coil 31. A connector 33*a*, 33*b* connects to both ends of the first working coil 31, and a connector 33*c*, 33*d* connects to both ends of the second working coil 32. The first working coil 31 and the second working coil 32 can electrically connect to a controller or a power supply part through the connector 33*a*, 33*b*, 33*c*, 33*d*.

An accommodation space for accommodating a temperature sensor 304 and a fuse 302 is formed at the center of the coil base 30.

When a container is placed on the first working coil 31 and the second working coil 32 and heated, the temperature of the container can be sensed through the temperature sensor 304. While the container is heated, the temperature of the container, sensed by the temperature sensor 304, is delivered to the controller of the induction heating apparatus. The controller stops the heating of the container when a temperature value of the container, sensed by the temperature sensor 304, or a rate of a change in the temperature value is greater than a predetermined reference value.

The fuse 302 is disposed at one side of the temperature sensor 304. As the temperature of the fuse 302 reaches a predetermined temperature value, the fuse 302 is melted and cut. As the fuse 302 is cut, the flow of current of the induction heating apparatus stops, and the induction heating apparatus stops operating. If the temperature of the container increases rapidly while the container is heated, the induction heating apparatus may fail or there can be a fire due to the overheating of the container, before a primary protection logic or a primary overheating prevention operation is performed by the temperature sensor 304 described above. In this case, a secondary protection logic or a secondary overheating prevention operation is performed by the fuse 302.

In the case where the fuse 302 is disposed in the induction heating apparatus apart from the temperature sensor 304, as illustrated in FIG. 1, the fuse 20 is cut as the secondary protection logic or the secondary overheating prevention operation is performed by the fuse 302. When the fuse 302 is cut due to overheating, the user cannot use the induction heating apparatus without replacing the fuse 302, and can feel inconvenient.

SUMMARY

The objective of the present disclosure is to provide an induction heating apparatus, and a method for controlling the same that can prevent a container from overheating without a fuse.

The objective of the present disclosure is to provide an induction heating apparatus, and a method for controlling the same that can operate again with no need to replace or repair a component even when a container stops heating due to the overheating of the container.

The objective of the present disclosure is to provide an induction heating apparatus and a method for controlling the same that can prevent a container form overheating despite an abnormality of a temperature sensor.

Aspects according to the present disclosure are not limited to the above ones, and other aspects and advantages that are not mentioned above can be clearly understood from the embodiments set forth herein. Additionally, the aspects and advantages in the present disclosure can be realized via components and combinations thereof that are described in the appended claims.

A method for controlling an induction heating apparatus of one embodiment comprises starting to heat a container, obtaining an inductance value of the container, calculating an overheating determination index based on the inductance value, comparing the overheating determination index with a predetermined first reference value, and determining whether to stop heating the container based on results of the comparison between the overheating determination index and the first reference value.

In one embodiment, determining whether to stop heating the container based on results of the comparison between the overheating determination index and the first reference value comprises determining to keep on heating the container when the overheating determination index is less than the first reference value, and determining to stop heating the container when the overheating determination index is the first reference value or greater.

In one embodiment, the method further comprises obtaining a temperature change index of the container.

In one embodiment, determining whether to stop heating the container based on results of the comparison between the overheating determination index and the first reference value comprises determining to keep on heating the container when the overheating determination index is less than the first reference value, determining to keep on heating the container when the temperature change index is greater than a predetermined second reference value while the overheating determination index is the first reference value or greater, and determining to stop heating the container when the temperature change index is the second reference value or less while the overheating determination index is the first reference value or greater.

In one embodiment, the overheating determination index is a value that is calculated by dividing the inductance value of the container by a predetermined initial inductance value.

The method for controlling an induction heating apparatus of one embodiment further comprises calculating a rate of a change in the inductance value, and changing the initial inductance value to a predetermined default value when the rate of a change in the inductance value is a predetermined third reference value or less, or a predetermined fourth reference value or greater.

In one embodiment, the rate of a change in the inductance value is a value that is calculated by dividing a currently obtained inductance value by a previously obtained inductance value.

In one embodiment, the temperature change index is an average of a rate of a change in temperature of the container.

In one embodiment, the rate of a change in the temperature of the container is a value that is calculated by dividing a temperature value of the container, obtained in a current determination cycle, by a temperature value of the container, obtained in a previous determination cycle.

In one embodiment, determining whether to stop heating the container is performed only when a temperature value of the container, measured after time for which the container is heated reaches predetermined reference time, is less than a predetermined reference temperature value.

An induction heating apparatus of one embodiment comprises a working coil, a power supply circuit supplying power for driving the working coil, and a controller controlling driving of the working coil by controlling driving of the power supply circuit.

In one embodiment, the controller starts to heat a container by driving the working coil, obtains an inductance value of the container, calculating an overheating determination index based on the inductance value, compares the overheating determination index with a predetermined first reference value, and determines whether to stop heating the container based on results of the comparison between the overheating determination index and the first reference value.

In one embodiment, the controller determines to keep on heating the container when the overheating determination index is less than the first reference value, and determines to stop heating the container when the overheating determination index is the first reference value or greater.

In one embodiment, the controller obtains a temperature change index of the container, determines to keep on heating the container when the overheating determination index is less than the first reference value, determines to keep on heating the container when the temperature change index is greater than a predetermined second reference value while the overheating determination index is the first reference value or greater, and determines to stop heating the container when the temperature change index is the second reference value or less while the overheating determination index is the first reference value or greater.

In one embodiment, the overheating determination index is a value that is calculated by dividing the inductance value of the container by a predetermined initial inductance value.

In one embodiment, the controller calculates a rate of a change in the inductance value, and changes the initial inductance value to a predetermined default value when the rate of a change in the inductance value is a predetermined third reference value or less, or a predetermined fourth reference value or greater.

In one embodiment, the rate of a change in the inductance value is a value that is calculated by dividing a currently obtained inductance value by a previously obtained inductance value.

In one embodiment, the temperature change index is an average of a rate of a change in temperature of the container.

In one embodiment, the rate of a change in the temperature of the container is a value that is calculated by dividing a temperature value of the container, obtained in a current determination cycle, by a temperature value of the container, obtained in a previous determination cycle.

In one embodiment, the controller determines whether to stop heating the container only when a temperature value of the container, measured after time for which the container is heated reaches predetermined reference time, is less than a predetermined reference temperature value.

The induction heating apparatus in the embodiments, may prevent a container from overheating without being provided with a fuse, resulting in a reduction in the manufacturing costs of the induction heating apparatus. Additionally, since there is no need to replace a fuse, user satisfaction with the quality of the induction heating apparatus may improve.

In the embodiments, even when a container stops heating due to the overheating of the container, the induction heating apparatus may operate again with no need to replace or repair a component.

The induction heating apparatus in the embodiments may prevent a container from overheating despite an abnormality of a temperature sensor.

BRIEF DESCRIPTION OF DRAWINGS

The accompanying drawings constitute a part of the specification, illustrate one or more embodiments in the disclosure, and together with the specification, explain the disclosure, wherein.

DETAILED DESCRIPTION

Figure 1:
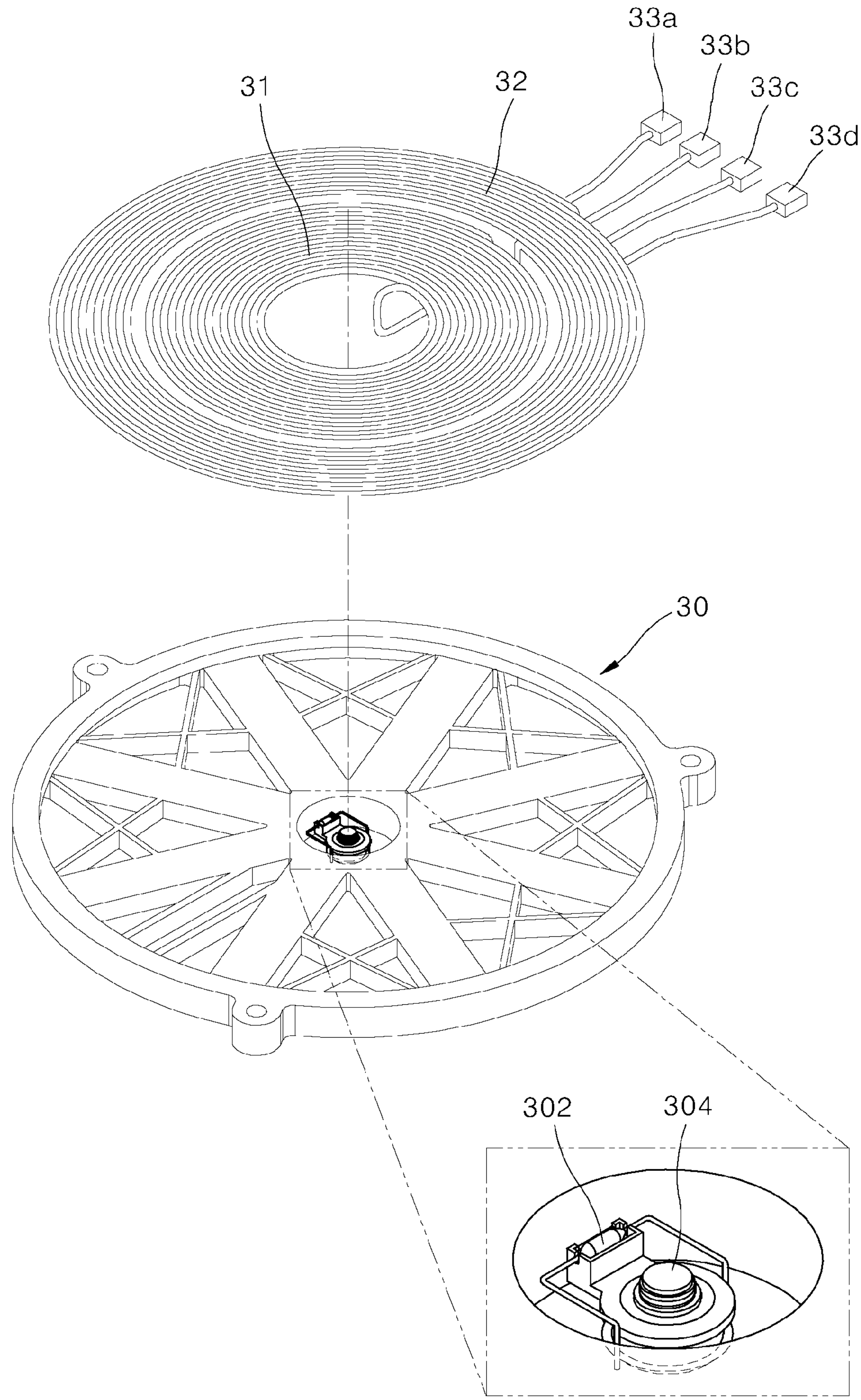
FIG. 1 is an exploded perspective view showing a working coil assembly being disposed in an induction heating apparatus of one embodiment.

The above-described aspects, features and advantages are specifically described hereafter with reference to accompanying drawings such that one having ordinary skill in the art to which the present disclosure pertains can embody the embodiments of the disclosure easily. In the disclosure, detailed description of known technologies in relation to the disclosure is omitted if it is deemed to make the gist of the disclosure unnecessarily vague. Hereafter, preferred embodiments according to the disclosure are specifically described with reference to the accompanying drawings. In the drawings, identical reference numerals can indicate identical or similar components.

Figure 2:
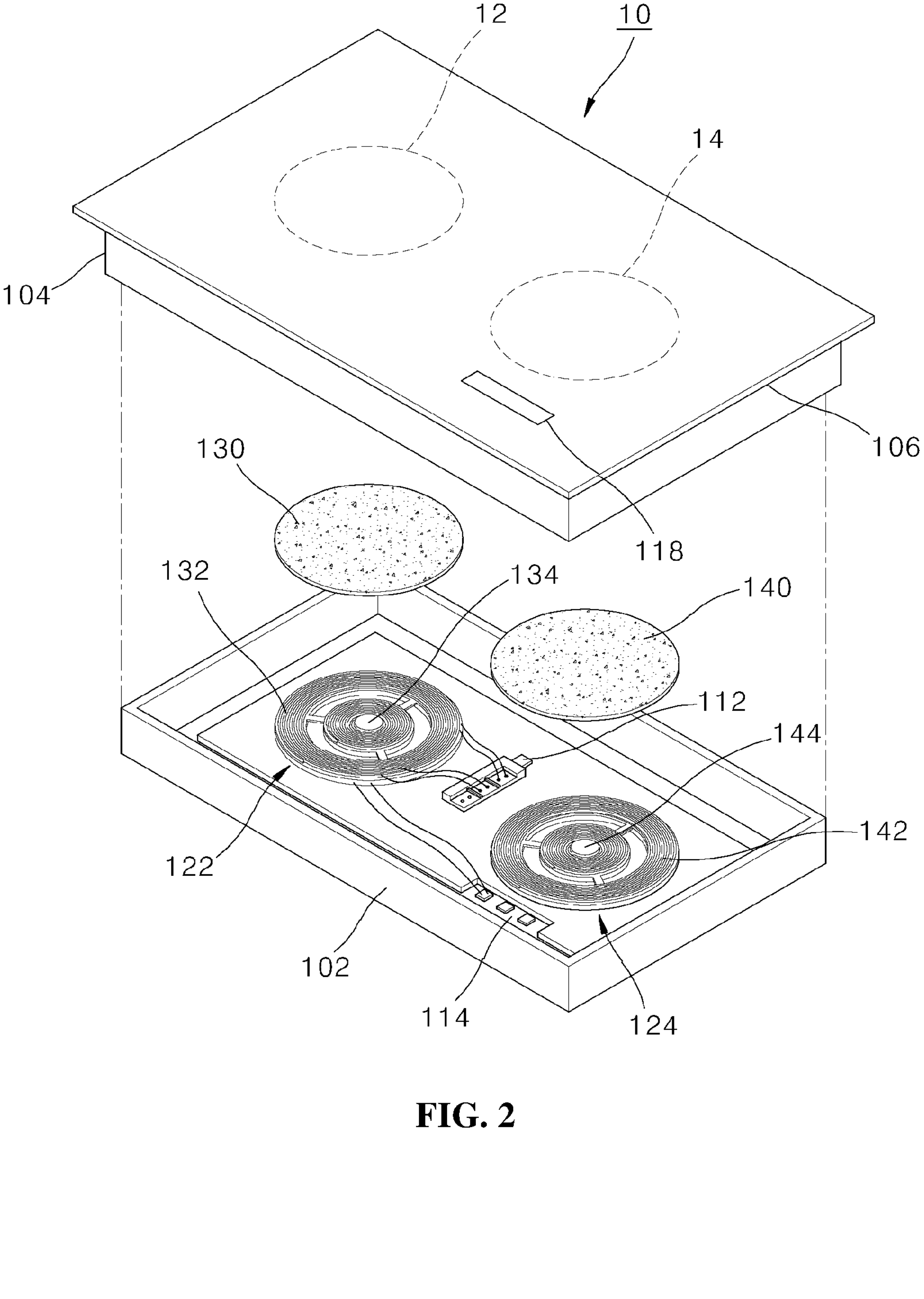
FIG. 2 is an exploded perspective view showing the induction heating apparatus of one embodiment.

FIG. 2 is an exploded perspective view showing the induction heating apparatus of one embodiment.

As illustrated in FIG. 2, the induction heating apparatus 10 of one embodiment comprises a case 102 constituting the main body of the induction heating apparatus 10, and a cover plate 104 being coupled to the case 102 and sealing the case 102.

The cover plate 104 seals a space, which is formed in the case 102 as the cover plate 104 is coupled to the upper surface of the case 102, from the outside. The cover plate 104 comprises an upper plate 106 on which a container for cooking a food item is placed. In one embodiment, the upper plate 106 may be made of tempered glass such as ceramic glass. However, the material for the upper plate 106 may vary depending on embodiments.

A first heating zone 12 and a second heating zone 14 respectively corresponding to a working coil assembly 122, 124 are formed on the upper plate 106. For the user to recognize the positions of the heating zone 12, 14 accurately, lines or figures corresponding to the heating zones 12, 14 may be printed or marked on the upper plate 106.

The case 102 may be formed into a cuboid the upper portion of which is open. The working coil assembly 122, 124 for heating a container is disposed in the space of the case 102.

Additionally, an interface part 114 (or an interface) is provided in the case 102, and performs the function of allowing the user to supply power or to adjust a power level of each heating zone 12, 14 and the function of displaying information on the induction heating apparatus 10.

The interface part 114 may be a touch panel that enables a touch-based input of information and a display of information, but depending on embodiments, the interface part 114 may be embodied as another device or another structure.

Additionally, a manipulation zone 118 is formed on the upper plate 106 and disposed in a position corresponding to the position of the interface part 114. For the user's manipulation, characters or images and the like may be printed in advance, in the manipulation zone 118. The user may touch a specific point of the manipulation zone 118 with reference to the characters or images printed in advance in the manipulation zone 118, to perform a desired manipulation. Further, information output by the interface part 114 may be displayed through the manipulation zone 118.

The user may set a power level of each of the heating zones 12, 14 through the interface part 114. Power levels may be expressed as numbers (e.g., 1, 2, 3, . . . , 9), on the manipulation zone 118. As a power level of each of the heating zones 12, 14 is set, a required power value and a heating frequency of a working coil corresponding to each of the heating zones 12, 14 are determined. A controller (not illustrated) drives each of the working coils, based on the determined heating frequency, such that an actual output power value of each of the working coils matches the required power value set by the user.

A power supply part 112 is disposed in the space of the case 102, and supplies power to the first working coil assembly 122, the second working coil assembly 124, and the interface part 114.

The embodiment of FIG. 2 shows two working coil assemblies, i.e., the first working coil assembly 122 and the second working coil assembly 124, in the case 102, for example. However, depending on embodiments, three or more working coil assemblies may be disposed in the case 102.

The working coil assemblies 122, 124 comprises a working coil forming an induction field by using high-frequency AC current that is supplied by the power supply part 112, and a thermal insulation sheet protecting the coil from heat that is generated by a container. For example, in FIG. 2, the first working coil assembly 122 comprises a first working coil 132 for heating a container that is placed in the first heating zone 12, and a first thermal insulation sheet 130, and the second working coil assembly 124 comprises a second working coil 142 for heating a container that is placed in the second heating zone 14, and a second thermal insulation sheet 140. Depending on embodiments, the thermal insulation sheet may not be disposed.

Further, a temperature sensor is disposed at the center of each of the working coils 132, 142. For example, in FIG. 2, a temperature sensor 134 is disposed at the center of the first working coil 134, and a second temperature sensor 144 is disposed at the center of the second working coil 142. The temperature sensor may measure the temperature of a container that is placed in each of the heating zones. In one embodiment, the temperature sensor may be a thermistor having variable resistance at which a resistance value changes depending on the temperature of a container, but not limited.

In one embodiment, the temperature sensor outputs a sensing voltage corresponding to the temperature of a container, and the sensing voltage output from the temperature sensor is delivered to the controller. The controller checks the temperature of the container, based on the magnitude of the sensing voltage output from the temperature sensor, and when a temperature value of the container or a rate of a change in the temperature of the container is a predetermined reference value or greater, performs the operation of preventing overheating by pulling down the output power value of a working coil or stopping the operation of the working coil.

Though not illustrated in FIG. 2, a circuit board on which a plurality of circuits or elements comprising the controller is mounted may be disposed in the space of the case 102.

The controller may perform a heating operation by driving each of the working coils 132, 142, according to the user's instruction to start heating that is input through the interface part 114.

As the user inputs an instruction to end heating through the interface part 114, the controller may stop the driving of the working coil 132, 142 and end the heating operation of the working coil 132, 142.

Figure 3:
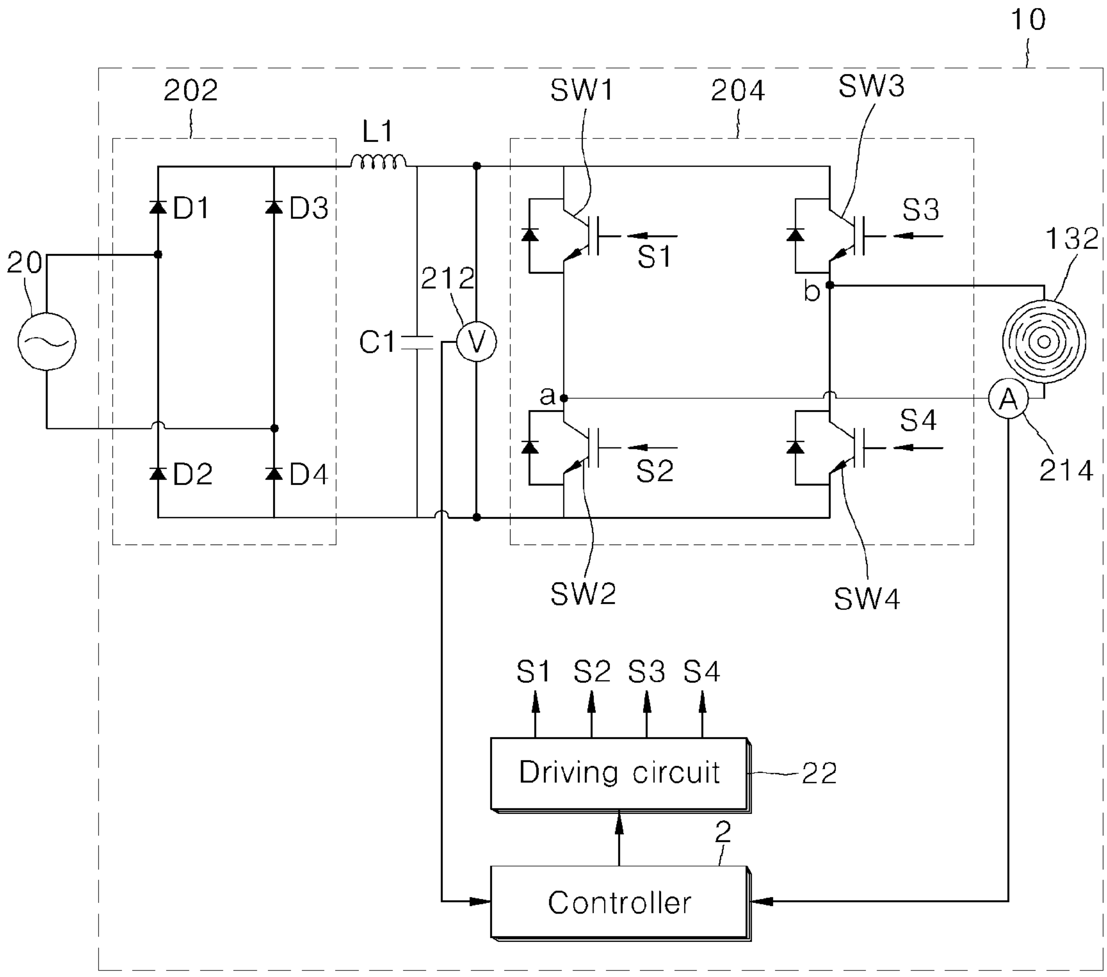
FIG. 3 is a circuit diagram of the induction heating apparatus of one embodiment.

FIG. 3 is a circuit diagram of the induction heating apparatus of one embodiment.

As illustrated in FIG. 3, the induction heating apparatus 10 of one embodiment comprises a rectifying circuit 202, a smoothing circuit L1, C1, an inverter circuit 204, a working coil 132, a controller 2, and a driving circuit 22.

The rectifying circuit 202 comprises a plurality of diode elements D1, D2, D3, D4. The rectifying circuit 202 may be a bridge diode circuit, and depending on embodiments, may be another circuit. The rectifying circuit 202 rectifies an AC input voltage that is supplied from the power supply device 20, and outputs a voltage having pulse waves.

The smoothing circuit L1, C1 smoothes the voltage rectified by the rectifying circuit 32 and outputs a DC link voltage. The smoothing circuit L1, C1 comprises a first inductor L1 and a DC link capacitor C1.

A voltage sensor 212 senses the magnitude of a voltage that is output from the DC link capacitor C1, and delivers the sensed voltage value to the controller 2.

A current sensor 214 senses the magnitude of current that is output from the inverter circuit 204, and delivers the sensed current value to the controller 2.

The controller 2 may calculate an inductance value of a container by using a voltage value measured by the voltage sensor 212 and a current value measured by the current sensor 214, when the container is heated. The controller 2 may perform the overheating prevention operation of preventing the overheating of the container, based on the calculated inductance value. Additionally, the controller 2 may perform the overheating prevention operation of preventing the overheating of the container, based on a temperature value or a rate of a change in temperature measured by the temperature sensor 134 illustrated in FIG. 2.

The inverter circuit 204 comprises a first switching element SW1, a second switching element SW2, a third switching element SW3 and a fourth switching element SW4.

In the embodiment of FIG. 3, the inverter circuit 204 of the induction heating apparatus 10 is embodied as a full bridge circuit comprising four switching elements SW1, SW2, SW3, SW4.

In another embodiment, the inverter circuit 204 may be a half bridge circuit comprising two switching elements.

The rectifying circuit 202, the smoothing circuit L1, C1, and the inverter circuit 204 may be referred to as a power supply circuit. That is, the power supply circuit may comprise the rectifying circuit 202, the smoothing circuit L1, C1 and the inverter circuit 204.

The first switching element SW1, the second switching element SW2, the third switching element SW3 and the fourth switching element SW4 are respectively turned on and turned off by a first switching signal S1, a second switching signal S2, a third switching signal S3 and fourth switching signal S4. Each of the switching elements SW1, SW2, SW3, SW4 is turned on when each of the switching signals S1, S2, S3, S4 is at a high level, and turned off when each of the switching signals S1, S2, S3, S4 is at a low level.

Figure 4:
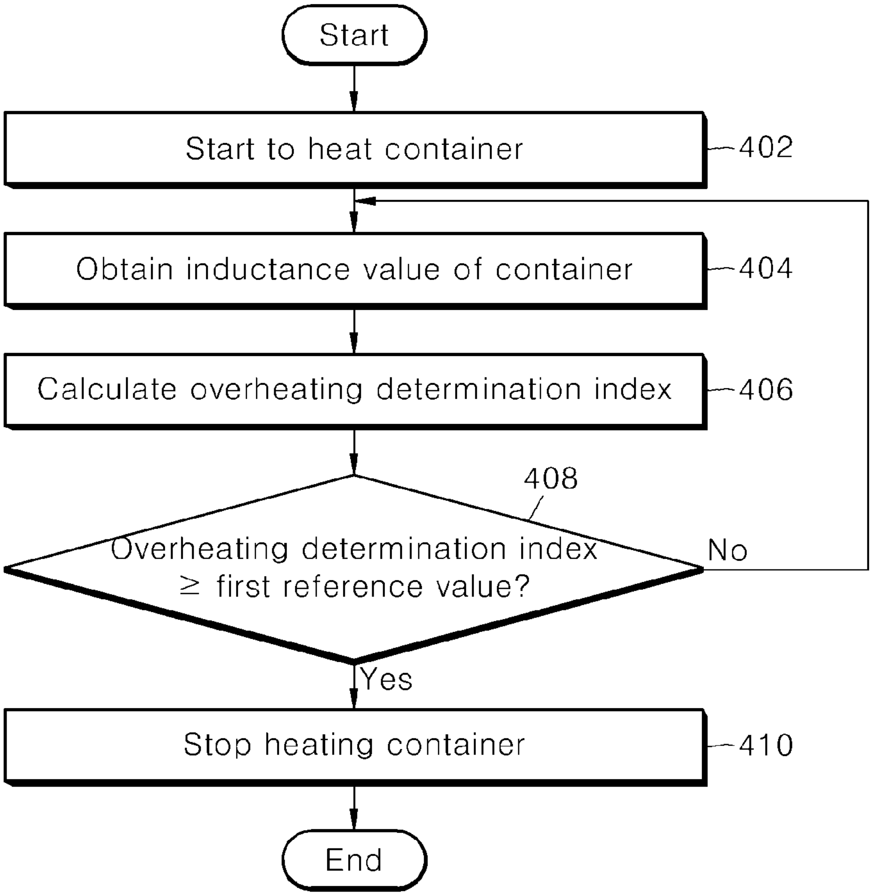
FIG. 4 is a flowchart showing a method for controlling an induction heating apparatus of one embodiment.

FIG. 4 shows that each of the switching elements SW1, SW2, SW3, SW4 is an IGBT element, for example. However, each of the switching elements SW1, SW2, SW3, SW4 may be another type of switching element (e.g., a BJT or an FET and the like), depending on embodiments.

Any of the switching elements SW1, SW2, SW3, SW4 may be mutually turned on and turned off alternately. For example, while the first switching element SW1 is turned on (turned off), the second switching element SW2 may be turned off (turned on).

Any of the switching elements SW1, SW2, SW3, SW4 may be mutually turned on and turned off identically. For example, the first switching element SW1 and the third switching element SW3 may be mutually turned on and turned off at the same time.

The DC link voltage input to the inverter circuit 204 is converted into AC current, based on the turn-on and turn-off operations, i.e., switching operations, of the switching elements SW1, SW2, SW3, SW4 included in the inverter circuit 204. The AC current converted by the inverter circuit 204 is supplied to the working coil 132.

In the present disclosure, each of the first switching signal S1, the second switching signal S2, the third switching signal S3 and the fourth switching signal S4 is a pulse width modulation (PWM) signal that has a predetermined duty cycle.

As the AC current output from the inverter circuit 204 is supplied to the working coil 132, the working coil 132 operates. As the working coil 132 operates, a container placed on the working coil 132 is heated while eddy current flows in the container. Depending on the magnitude of power that is generated actually by the driving of the working coil 132 during the driving of the working coil 132, i.e., an actual output power value of the working coil, the magnitude of heat energy that is supplied to the container varies.

As the user turns on (powers on) the induction heating apparatus 10 by manipulating the interface part of the induction heating apparatus 10, the induction heating apparatus is on standby for driving while power is supplied from an input power source 20 to the induction heating apparatus. Then the user places a container on a working coil of the induction heating apparatus, and inputs an instruction to start heating to the working coil by setting a power level for the container. As the user inputs the instruction to start heating, a power value required of the working coil 132, i.e., a required power value, is determined based on the power level set by the user.

As the instruction to start heating is input, the controller 2 determines a frequency corresponding to the required power value of the working coil 132, i.e., a heating frequency, and supplies a control signal corresponding to the determined heating frequency to the driving circuit 22. Accordingly, as switching signals S1, S2, S3, S4 are output from the driving circuit 22, and are respectively input to switching elements SW1, SW2, SW3, SW4, the working coil 132 operates. As the working coil 132 operates, the container is heated while eddy current flows in the container.

In one embodiment, the controller 2 determines a heating frequency that is a frequency corresponding to a power level for a heating zone, set by the user. For example, as the user sets a power level for a heating zone, the controller 2 may pull down the driving frequency of the inverter circuit 204 gradually until the output power value of the working coil 132 matches a required power value corresponding to the power level set by the user in the state where the driving frequency of the inverter circuit 204 is set to a predetermined reference frequency. The controller 2 may determine the frequency at a time when the output power value of the working coil 132 matches the required power value, as a heating frequency.

The controller 2 supplies a control signal corresponding to the determined heating frequency to the driving circuit 22. The driving circuit 22 outputs switching signals S1, S2, S3, S4 having a duty ratio that corresponds to the heating frequency determined by the controller 2, based on the control signal output from the controller 2. As the switching signals S1, S2, S3, S4 are input, AC current is supplied to the working coil 132 while the switching elements SW1, SW2, SW3, SW4 are complementarily turned on and turned off.

For the controller 2 to determine a heating frequency, as described above, the actual output power value of the working coil 132 needs to be calculated during the driving of the working coil 132. In one embodiment, the controller 2 may calculate the output power value of the working coil 132, based on the magnitude of an output voltage of the DC link capacitor C1 measured by the voltage sensor 212, i.e., a DC link voltage value, and the magnitude of output current of the inverter circuit 204 measured by the current sensor 214, i.e., an output current value of the inverter circuit 204.

To calculate the output power value of the working coil 132 accurately during the driving of the working coil 132, the magnitude of a voltage that is input to the working coil 132, and the magnitude of current that is input to the working coil 132 are respectively required.

The magnitude of current that is input to the working coil 132 is substantially the same as the magnitude of current output from the inverter circuit 204, i.e., the output current value of the inverter circuit 204.

In one embodiment, the magnitude of a voltage that is input to the working coil 132 is substantially the same as the magnitude of a voltage output from the inverter circuit 204, i.e., the output voltage value of the inverter circuit 204. In one embodiment, the output voltage value of the inverter circuit 204 may be calculated based on a DC link voltage function and a switching function of the inverter circuit 204.

FIG. 4 is a flowchart showing a method for controlling an induction heating apparatus of one embodiment.

As the user inputs an instruction to start heating, a controller 2 drives a working coil 132. Accordingly, a container starts to heat (402).

As the container starts to heat, the controller 2 obtains an inductance value of the container (404). In one embodiment, the controller 2 may calculate the inductance value of the container, based on a voltage value measured by a voltage sensor 212 and a current value measured by a current sensor 214.

For example, the controller 2 may calculate the inductance value of the container, based on equation 1.

$$L_{eq} = \frac{1}{\omega}\sqrt{Z^2 - R^2} + \frac{1}{\omega^2 C_{eq}} \quad \text{[Equation 1]}$$

In equation 1, Leq denotes the inductance value of a container, ω equals 2πf (f denotes a heating frequency), and Ceq denotes the capacitance value of the container. Additionally, Z (the impedance value of the container) may be calculated based on equation 2, and R (the resistance value of the container) may be calculated based on equation 3.

$$Z = \frac{\sqrt{2} * V_{in}}{\pi * (I_{peak}/2)} \quad \text{[Equation 2]}$$

$$R = \frac{V_{in} I_{in}}{(I_{peak}/2)^2} \quad \text{[Equation 3]}$$

In equation 2 and equation 3, Vin denotes the voltage value measured by the voltage sensor 212, Iin denotes the current value measured by the current sensor 214, and Ipeak denotes a peak (or a maximum value) of current values measured by the current sensor 214.

The method of calculating the inductance value based on equation 1 to equation 3 is provided as an example, and the controller 2 may calculate the inductance value of the container, based on another method widely known.

As the inductance value is obtained in step 404, the controller 2 calculates an overheating determination index (406). In one embodiment, the controller 2 may calculate the overheating determination index, based on equation 4.

$$L_{eq\_Critical} = \frac{L_{eq}}{L_{eq\_init}} \quad \text{[Equation 4]}$$

In equation 4, Leq_critical denotes the overheating determination index, Leq denotes the inductance value of the container, and Leq_init denotes an initial inductance value.

In one embodiment, as a preset value, the initial inductance value may be set differently depending on embodiments.

As the overheating determination index is calculated in step 406, the controller 2 compares the overheating determination index with a predetermined first reference value (408). The controller 2 determines whether to stop heating the container, based on results of the comparison in step 408.

When the overheating determination index is less than the first reference value, the controller 2 determines that the container does not overheat and determines to keep on heating the container. Accordingly, the controller 2 performs step 404 again.

When the overheating determination index is the first reference value or greater, the controller 2 determines that the container overheats and determines to stop heating the container. Accordingly, the controller 2 stops the operation of the working coil 132, and the container stops heating (410). Even when the container stops heating in step 410, the user may operate the induction heating apparatus again with no need to replace or repair a component of the induction heating apparatus.

In one embodiment, the first reference value may be set based on equation 5.

$$L_{eq\_standard} = 1.2 \times L_{eq\_init} \quad \text{[Equation 5]}$$

In equation 5, Leq_standard denotes the first reference value, and Leq_init denotes a predetermined initial inductance value. In equation 5, 1.2 is an exemplary value, and may be set differently depending on embodiments.

Figure 5:
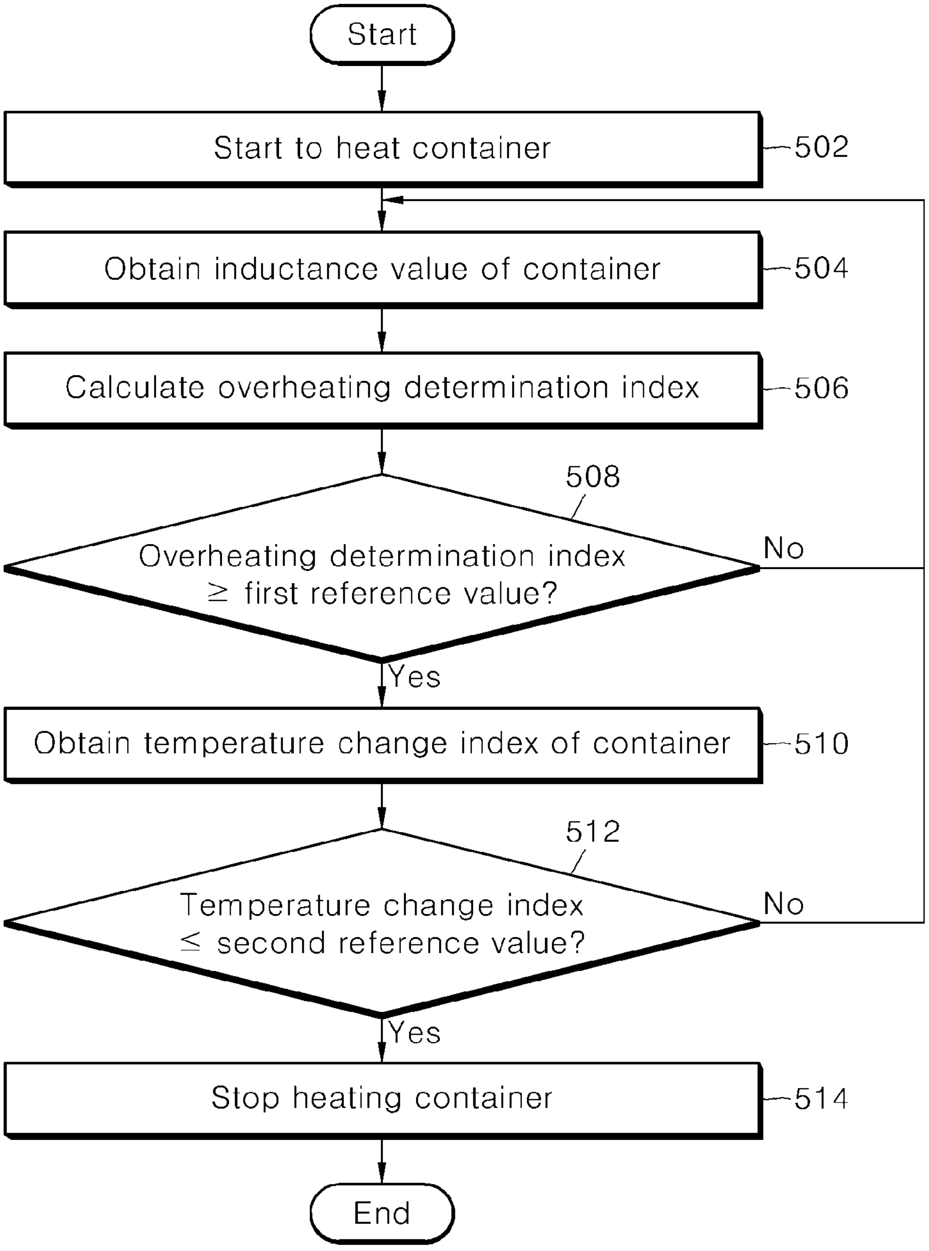
FIG. 5 is a flowchart showing a method for controlling an induction heating apparatus of another embodiment.

FIG. 5 is a flowchart showing a method for controlling an induction heating apparatus of another embodiment.

As the user inputs an instruction to start heating, the controller 2 drives a working coil 132. Accordingly, a container starts to heat (502).

As the container starts to heat, the controller 2 obtains an inductance value of the container (504). In one embodiment, the controller 2 may calculate the inductance value of the container by using a voltage value measured by a voltage sensor 212 and a current value measured by a current sensor 214. For example, the controller 2 may calculate the inductance value of the container, based on equation 1.

As the inductance value is obtained in step 504, the controller 2 calculates an overheating determination index (506). In one embodiment, the controller 2 may calculate the overheating determination index, based on equation 4.

As the overheating determination index is calculated in step 506, the controller 2 compares the overheating determination index with a predetermined first reference value (508).

When the overheating determination index is less than the first reference value, the controller 2 determines that the container does not overheat and determines to keep on heating the container. Accordingly, the controller 2 performs step 504 again.

When the overheating determination index is the first reference value or greater, the controller 2 obtains a temperature change index of the container (510). In one embodiment, the controller 2 may calculate the temperature change index of the container, based on equation 6.

$$T_{s\_gradient\_avg} = \frac{\sum \frac{T_s(n)}{T_s(n-1)}}{n} \quad \text{[Equation 6]}$$

In equation 6, Ts_gradient_avg denotes the temperature change index, n denotes the number of times of measurement of a temperature value measured by a temperature sensor 134, Ts(n) denotes a currently measured temperature value, and Ts(n−1) denotes a previously measured temperature value. In equation 6, the temperature change index may be defined as an average of a rate of a change in temperatures (a value calculated by dividing the currently measured temperature value by the previously measured temperature value).

As the temperature change index is obtained in step 510, the controller 2 compares the temperature change index with a predetermined second reference value (512). The second reference value is a predetermined value (e.g., 1), and may be set differently depending on embodiments.

When the temperature change index exceeds the second reference value, the controller 2 determines that the container does not overheat, and determines to keep on heating the container. Accordingly, the controller 2 performs step 504 again.

As the temperature change index is the second reference value or less, the controller 2 determines that the container overheats and determines to stop heating the container. Accordingly, the controller 2 stops the driving of the working coil 132, and the container stops heating (514). Even when the container stops heating in step 514, the user may drive the induction heating apparatus again without replacing or repairing a component of the induction heating apparatus.

Figure 6:
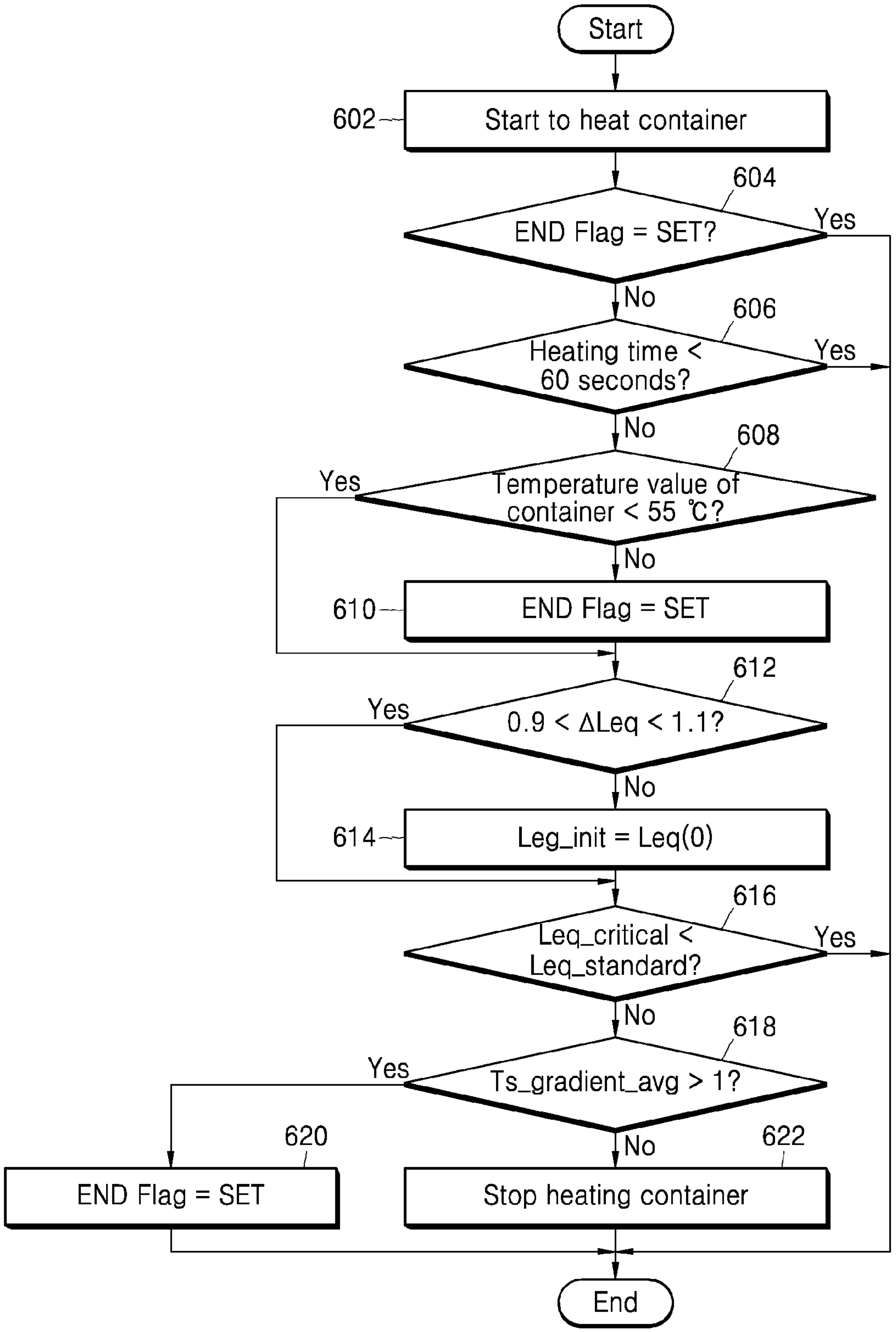
FIG. 6 is a flowchart showing a method for controlling an induction heating apparatus of yet another embodiment.

FIG. 6 is a flowchart showing a method for controlling an induction heating apparatus of yet another embodiment.

As the user inputs an instruction to start heating, a controller 2 drives a working coil 132. Accordingly, the container starts to heat 602.

As the heating of the container starts, the controller 2 checks whether the value of an END flag stored in a memory unit (e.g., a volatile memory or a non-volatile memory) is a first value (e.g., SET) (604).

In one embodiment, an END flag, which is a variable indicating whether the overheating prevention operation based on an inductance value is performed, is stored in a memory unit that is included in the induction heating apparatus. When the value of the END flag is set to the first value (e.g., SET), step 606 to step 622, illustrated in FIG. 6, are not performed. When the value of the END flag is set to a second value (e.g., CLR), step 606 to step 622 are performed, and the overheating prevention operation based on an inductance value is performed.

In one embodiment, as the container starts to heat, the value of the END flag may be set to the second value (e.g., CLR). In other words, an initial value of the END flag may be the second value.

When the value of the END flag is the first value in step 604, the controller 2 does not perform step 606 to step 622.

When the value of the END flag is not the first value in step 604, the controller 2 checks whether the time for which the container is heated is less than predetermined reference time (e.g., 60 seconds) (606). In one embodiment, the time for which a container is heated denotes time that passes from a time point at which the container starts to heat.

When the time for which the container is heated is less than the reference time in step 606, step 608 to step 622 are not performed.

When the time for which the container is heated is the reference time or greater in step 606, in other words, the time for which the container is heated reaches the reference time, the controller 2 checks whether the temperature value of the container, measured by a temperature sensor 134, is less than a predetermined reference temperature value (e.g., 55° C.) (608).

When the temperature value of the container, checked in step 608, is the reference temperature value or greater, the controller 2 changes the value of the END flag stored in the memory unit to the first value (e.g., SET) (610), and step 612 is performed.

When the temperature value of the container, checked in step 608, is less than the reference temperature value, step 612 is performed.

The controller 2 obtains an inductance value of the container and calculates a rate of a change in the inductance value of the container in step 612, and checks whether the calculated rate of a change in the inductance value is greater than a predetermined third reference value and less than a predetermined fourth reference value.

In one embodiment, the controller 2 may calculate the rate of a change in the inductance value of the container, based on equation 7.

$$\Delta L_{eq} = \frac{L_{eq}(n)}{L_{eq}(n-1)} \quad \text{[Equation 7]}$$

In equation 7, ΔLeq denotes the rate of a change in the inductance value of the container, Leq(n−1) denotes a previously obtained inductance value of the container, and Leq(n) denotes a currently obtained inductance value of the container.

When the rate of a change in the inductance value of the container, checked in step 612, is the third reference value or less or the fourth reference value or greater, the controller 2 changes an initial inductance value Leq_init to a predetermined default value Leq(0) (614), and step 616 is performed. In one embodiment, the initial inductance value is a predetermined value, and may be set differently, depending on embodiments. In one embodiment, the default value Leq(0) is a predetermined value, and may be set differently depending on embodiments.

When the rate of a change in the inductance value of the container, checked in step 612, is greater than the third reference value and less than the fourth reference value, step 616 is performed.

In step 616, the controller 2 calculates an overheating determination index Leq_critical, and compares the overheating determination index with a predetermined first reference value Leq_standard (616). In one embodiment, the controller 2 may calculate the overheating determination index, based on equation 4. In one embodiment, the first reference value may be set based on equation 5.

When the overheating determination index is less than the first reference value in step 616, the controller 2 determines that the container does not overheat and determines to keep on heating the container. Accordingly, step 618 to step 622 are not performed.

When the overheating determination index is the first reference value or greater in step 616, the controller 2 obtains a temperature change index of the container, and compares the temperature change index with a predetermined second reference value (e.g., 1). In one embodiment, the controller 2 may calculate the temperature change index of the container, based on equation 6.

When the temperature change index exceeds the second reference value, the controller 2 determines that the container does not overheat and determines to keep on heating the container. Accordingly, the controller 2 sets the value of the END flag to the first value (e.g., SET) (620), and the container continues to heat.

When the temperature change index is the second reference value or less, the controller 2 determines that the container overheats and determines to stop heating the container. As the controller 2 stops the driving of the working coil 132, the container stops heating (622). Even when the container stops heating in step 622, the user may drive the induction heating apparatus again without replacing or repairing a component of the induction heating apparatus.

In the embodiments described above, the controller 2 determines whether a container overheats, based on an overheating determination index that is calculated based on the inductance value of the container. As the temperature of a container increases, the inductance value of the container increases. Accordingly, the controller 2 may determine whether the container overheats by monitoring the inductance value of the container.

In the embodiments described above, the controller 2 determines whether a container overheats, based on an overheating determination index that is calculated based in the inductance value of the container, and when determining that the container overheats, stops the heating of the container. Thus, the overheating prevention operation may be performed even in the situation where the overheating prevention operation based on a temperature value measured by the temperature sensor 134 is not performed properly due to a rapid increase in the temperature of the container or an abnormality of the temperature sensor 134.

In the embodiments described above, since no fuse for the overheating prevention operation is required, costs of manufacturing an induction heating apparatus decreases.

In the embodiments described above, even when a container overheats and stops heating, the induction heating apparatus may be driven again with no need to replace or repair a specific component. Thus, the user can use the induction heating apparatus more conveniently.

The embodiments are described above with reference to a number of illustrative embodiments thereof. However, embodiments are not limited to the embodiments and drawings set forth herein, and numerous other modifications and embodiments can be drawn by one skilled in the art. Further, the effects and predictable effects based on the configurations in the disclosure are to be included within the range of the disclosure though not explicitly described in the description of the embodiments.

What is claimed is:

1. A method of controlling an induction heating apparatus by a controller, comprising:
- heating a container;
- determining an inductance value of the container;
- calculating an overheating determination index based on the inductance value;
- comparing the overheating determination index with a first reference value; and
- determining whether to stop heating the container based on results of the comparison between the overheating determination index and the first reference value.

2. The method of claim 1, wherein determining whether to stop heating the container based on results of the comparison between the overheating determination index and the first reference value, comprises:
- determining to keep on heating the container in response to the overheating determination index being less than the first reference value; and
- determining to stop heating the container in response to the overheating determination index being equal to the first reference value or greater.

3. The method of claim 1, wherein determining whether to stop heating the container based on results of the comparison between the overheating determination index and the first reference value, comprises:
- determining a temperature change index of the container,
- determining to keep on heating the container in response to the overheating determination index being less than the first reference value;
- determining to keep on heating the container in response to the temperature change index being greater than a second reference value while the overheating determination index is equal to the first reference value or greater; and
- determining to stop heating the container in response to the temperature change index being equal to the second reference value or less while the overheating determination index is equal to the first reference value or greater.

4. The method of claim 1, wherein the overheating determination index is a value that is calculated by dividing the inductance value of the container by an initial inductance value.

5. The method of claim 3, further comprising:
- calculating a rate of a change in the inductance value; and
- changing an initial inductance value to a default value when the rate of a change in the inductance value is equal to a third reference value or less, or is equal to a fourth reference value or greater.

6. The method of claim 5, wherein the rate of a change in the inductance value is a value that is calculated by dividing a currently obtained inductance value by a previously obtained inductance value.

7. The method of claim 3, wherein the temperature change index is an average of a rate of a change in temperature of the container, and
- the rate of a change in the temperature of the container is a value that is calculated by dividing a currently obtained temperature value of the container by a previously obtained temperature value of the container.

8. The method of claim 1, wherein determining whether to stop heating the container is performed in response to a temperature value of the container, measured after time for which the container is heated reaches a reference time, is less than a reference temperature value.

9. An induction heating apparatus, comprising:
- a working coil;
- a power supply circuit to supply power for driving the working coil; and
- a controller configured to drive the working coil by controlling driving of the power supply circuit,
- wherein the controller is configured to heat a container by driving the working coil, determine an inductance value of the container, calculate an overheating determination index based on the inductance value, compare the overheating determination index with a first reference value, and determine whether to stop heating the container based on results of the comparison between the overheating determination index and the first reference value.

10. The induction heating apparatus of claim 9, wherein the controller is configured to keep on heating the container in response to the overheating determination index being less than the first reference value, and stop heating the container in response to the overheating determination index being equal to the first reference value or greater.

11. The induction heating apparatus of claim 9, wherein the controller is configured to determine a temperature change index of the container, determine to keep on heating the container in response to the overheating determination index being less than the first reference value, determine to keep on heating the container in response to the temperature change index being greater than a second reference value while the overheating determination index is equal to the first reference value or greater, and determine to stop heating the container in response to the temperature change index being equal to the second reference value or less while the overheating determination index is equal to the first reference value or greater.

12. The induction heating apparatus of claim 9, wherein the overheating determination index is a value that is calculated by dividing the inductance value of the container by an initial inductance value.

13. The induction heating apparatus of claim 11, wherein the controller configured to calculate a rate of a change in the inductance value, and change an initial inductance value to a default value when the rate of a change in the inductance value is equal to a third reference value or less, or is equal to a fourth reference value or greater.

14. The induction heating apparatus of claim 13, wherein the rate of a change in the inductance value is a value that is calculated by dividing a currently obtained inductance value by a previously obtained inductance value.

15. The induction heating apparatus of claim 11, wherein the temperature change index is an average of a rate of a change in temperature of the container, and the rate of a change in the temperature of the container is a value that is calculated by dividing a currently obtained temperature value of the container by a previously obtained temperature value of the container.

16. The induction heating apparatus of claim 11, wherein the controller is configured to stop heating the container in response to a temperature value of the container, measured after time for which the container is heated reaches a reference time, is less than a reference temperature value.

17. A non-transitory controller readable medium containing executable instructions therein, which when executed by a controller, causes the controller to perform a method comprising:

heating a container;

determining an inductance value of the container;

calculating an overheating determination index based on the inductance value;

comparing the overheating determination index with a first reference value; and determining whether to stop heating the container based on results of the comparison between the overheating determination index and the first reference value.

18. The non-transitory controller readable medium of claim 17, wherein determining whether to stop heating the container based on results of the comparison between the overheating determination index and the first reference value, comprises:

determining to keep on heating the container in response to the overheating determination index being less than the first reference value; and determining to stop heating the container in response to the overheating determination index being equal to the first reference value or greater.

19. The non-transitory controller readable medium of claim 17, wherein determining whether to stop heating the container based on results of the comparison between the overheating determination index and the first reference value, comprises:

determining a temperature change index of the container, determining to keep on heating the container in response to the overheating determination index being less than the first reference value;

determining to keep on heating the container in response to the temperature change index being greater than a second reference value while the overheating determination index is equal to the first reference value or greater; and determining to stop heating the container in response to the temperature change index being equal to the second reference value or less while the overheating determination index is equal to the first reference value or greater.

20. The non-transitory controller readable medium of claim 19, further comprising:

calculating a rate of a change in the inductance value; and changing an initial inductance value to a default value when the rate of a change in the inductance value is equal to a third reference value or less, or is equal to a fourth reference value or greater.

* * * * *